US008977306B2

(12) United States Patent
Sweeney

(10) Patent No.: US 8,977,306 B2
(45) Date of Patent: Mar. 10, 2015

(54) PERMISSION BASED TEXT MESSAGING

(71) Applicant: Destine Systems Co. L.L.C., Dover, DE (US)

(72) Inventor: Robert J. Sweeney, Parkville, MO (US)

(73) Assignee: Destine Systems Co. L.L.C., Dover, DE (US)

( * ) Notice: Subject to any disclaimer, the term of this patent is extended or adjusted under 35 U.S.C. 154(b) by 0 days.

(21) Appl. No.: 14/153,866

(22) Filed: Jan. 13, 2014

(65) Prior Publication Data

US 2014/0128035 A1 May 8, 2014

Related U.S. Application Data

(63) Continuation of application No. 13/776,433, filed on Feb. 25, 2013, now Pat. No. 8,630,670, which is a continuation of application No. 13/242,581, filed on Sep. 23, 2011, now Pat. No. 8,385,955, which is a continuation of application No. 11/726,896, filed on Mar. 23, 2007, now Pat. No. 8,046,012, which is a continuation of application No. 11/047,155, filed on Jan. 31, 2005, now Pat. No. 7,197,324.

(51) Int. Cl.

| | |
|---|---|
| ***H04W 4/00*** | (2009.01) |
| ***H04L 29/06*** | (2006.01) |
| ***H04M 3/00*** | (2006.01) |
| ***H04W 8/18*** | (2009.01) |
| ***H04W 4/12*** | (2009.01) |
| ***H04L 12/58*** | (2006.01) |
| ***H04W 4/14*** | (2009.01) |
| ***H04W 12/06*** | (2009.01) |

(Continued)

(52) U.S. Cl.

CPC *H04W 8/18* (2013.01); *H04W 4/12* (2013.01); *H04L 12/5895* (2013.01); *H04L 51/38* (2013.01); *H04W 4/14* (2013.01); *H04W 12/06* (2013.01); *H04L 12/1859* (2013.01); *H04W 4/06* (2013.01); *H04L 67/26* (2013.01)

USPC ........................ 455/466; 455/414.3; 455/419

(58) Field of Classification Search

USPC ...................................... 455/466, 414.3, 419

See application file for complete search history.

(56) References Cited

U.S. PATENT DOCUMENTS 6,289,223 B1 9/2001 Mukherjee et al.
6,338,140 B1 1/2002 Owens et al.

(Continued)

FOREIGN PATENT DOCUMENTS

WO 97/41654 11/1997
WO 2004/100470 11/2004

OTHER PUBLICATIONS

PersonalizeYour Mobile Phone with Text Messaging, SMSMG.com: Mobile Alerts, http://web.archive.orglweb/20040328012731/http:/lsmsmg.com, Mar. 28, 2004, 2 pages. [Retrieved Jul. 6, 2007].

(Continued)

*Primary Examiner* — Christopher M Brandt

(74) *Attorney, Agent, or Firm* — Meyertons, Hood, Kivlin, Kowert & Goetzel, P.C.

(57) ABSTRACT

A user may receive one or more text messages after the user is authorized. The potential user can opt in through a web page in one embodiment. Once the potential user sends an initial request, the user may receive a first text message containing an authorization code on their mobile phone. The user may enter the authorization code back to a web page. Receipt of the authorization code may trigger the phone number of the potential user to be added to a list of authorized text message receivers. One or more text messages may then be sent to authorized phone numbers on the list.

20 Claims, 6 Drawing Sheets

(51) Int. Cl.

| | |
|---|---|
| *H04L 12/18* | (2006.01) |
| *H04W 4/06* | (2009.01) |
| *H04L 29/08* | (2006.01) |

(56) References Cited

U.S. PATENT DOCUMENTS

| | | | |
|---|---|---|---|
| 6,366,791 | B1 | 4/2002 | Lin et al. |
| 6,430,409 | B1 | 8/2002 | Rossmann |
| 6,741,856 | B2 | 5/2004 | McKenna et al. |
| 6,819,932 | B2 | 11/2004 | Allison et al. |
| 6,834,195 | B2 | 12/2004 | Brandenberg et al. |
| 6,944,447 | B2 | 9/2005 | Portman et al. |
| 6,993,658 | B1 | 1/2006 | Engberg et al. |
| 6,996,393 | B2 | 2/2006 | Pyhalammi et al. |
| 7,024,211 | B1 | 4/2006 | Martin |
| 7,054,626 | B2 | 5/2006 | Rossmann |
| 7,107,068 | B2 | 9/2006 | Benzon et al. |
| 7,113,981 | B2 | 9/2006 | Slate |
| 7,142,840 | B1 | 11/2006 | Geddes et al. |
| 7,174,005 | B1 | 2/2007 | Rodkey et al. |
| 7,197,297 | B2 | 3/2007 | Myles et al. |
| 7,218,918 | B1 | 5/2007 | Alston |
| 7,218,921 | B2 | 5/2007 | Mendiola et al. |
| 7,242,923 | B2 | 7/2007 | Perera et al. |
| 7,245,902 | B2 | 7/2007 | Hawkes |
| 7,308,498 | B1 | 12/2007 | Olsen et al. |
| 7,555,265 | B2 | 6/2009 | Uchiyama |
| 7,912,457 | B2 | 3/2011 | Chandhok et al. |
| 2001/0047294 | A1 | 11/2001 | Rothschild |
| 2002/0029342 | A1 | 3/2002 | Keech |
| 2002/0037716 | A1 | 3/2002 | McKenna et al. |
| 2002/0090934 | A1 | 7/2002 | Mitchelmore |
| 2002/0107002 | A1 | 8/2002 | Duncan et al. |
| 2002/0111907 | A1 | 8/2002 | Ling |
| 2002/0123359 | A1 | 9/2002 | Wei et al. |
| 2002/0164977 | A1 | 11/2002 | Link, II et al. |
| 2003/0036396 | A1 | 2/2003 | Back et al. |
| 2003/0087652 | A1 | 5/2003 | Simon et al. |
| 2003/0100337 | A1 | 5/2003 | Chotkowski et al. |
| 2003/0191691 | A1 | 10/2003 | Macleod |
| 2003/0195009 | A1 | 10/2003 | Endo |
| 2004/0038690 | A1 | 2/2004 | Lee et al. |
| 2004/0140989 | A1 | 7/2004 | Papageorge |
| 2004/0143550 | A1 | 7/2004 | Creamer et al. |
| 2004/0180683 | A1 | 9/2004 | Dennis et al. |
| 2004/0191339 | A1 | 9/2004 | Bibb |
| 2004/0203903 | A1 | 10/2004 | Wilson et al. |
| 2004/0224693 | A1 | 11/2004 | O'Neil et al. |
| 2004/0247090 | A1 | 12/2004 | Nurmela |
| 2004/0248600 | A1 | 12/2004 | Kim |
| 2005/0049022 | A1 | 3/2005 | Mullen |
| 2005/0050144 | A1 | 3/2005 | Borin |
| 2005/0160038 | A1 | 7/2005 | Albornoz |
| 2005/0288044 | A1 | 12/2005 | Atkins et al. |
| 2006/0002556 | A1 | 1/2006 | Paul |
| 2006/0003694 | A1 | 1/2006 | Quelle |
| 2006/0004632 | A1 | 1/2006 | Kelsen et al. |
| 2006/0058048 | A1 | 3/2006 | Kapoor et al. |
| 2006/0100898 | A1 | 5/2006 | Pearce et al. |
| 2006/0131390 | A1 | 6/2006 | Kim |
| 2006/0179304 | A1 | 8/2006 | Han |
| 2006/0180660 | A1 | 8/2006 | Gray |
| 2007/0088952 | A1 | 4/2007 | Hewitt et al. |
| 2007/0288392 | A1 | 12/2007 | Peng et al. |
| 2008/0086379 | A1 | 4/2008 | Dion et al. |
| 2008/0263169 | A1 | 10/2008 | Brabec et al. |
| 2009/0048938 | A1 | 2/2009 | Dupray |

OTHER PUBLICATIONS mPrivacy Policies, http://web.archive.orglweb/20040228033734/http://www.mprivacy.com/privacy.html, Feb. 28, 2004, 3 pages. [Retrieved Jul. 6, 2007].

Office Action in U.S. Appl. No. 11/726,896 issued Nov. 30, 2009, 12 pages.

Response to Office Action in U.S. Appl. No. 11/726,896 issued Nov. 30, 2009, mailed Mar. 3, 2010, 13 pages.

Office Action in U.S. Appl. No. 11/726,896 issued May 12, 2010, 13 pages.

Response to Office Action in U.S. Appl. No. 11/726,896 issued May 12, 2010, mailed Jul. 12, 2010, 11 pages.

Office Action in U.S. Appl. No. 11/726,896 issued Jan. 20, 2011, 8 pages.

Response to Office Action in U.S. Appl. No. 11/726,896 issued Jan. 20, 2011, mailed Apr. 7, 2011, 10 pages.

Office Action in U.S. Appl. No. 11/047,155 issued Aug. 14, 2006, 14 pages.

Response to Office Action in U.S. Appl. No. 11/047,155 issued Aug. 14, 2006, mailed Nov. 7, 2006, 16 pages.

Office Action in U.S. Appl. No. 13/242,581 issued Feb. 17, 2012, 14 pages.

Response to Office Action in U.S. Appl. No. 13/242,581 issued Feb. 17, 2012, mailed May 16, 2012, 11 pages.

Office Action in U.S. Appl. No. 13/242,581 issued Aug. 8, 2012, 19 pages.

Response to Office Action in U.S. Appl. No. 13/242,581 issued Aug. 8, 2012, mailed Sep. 28, 2012, 11 pages.

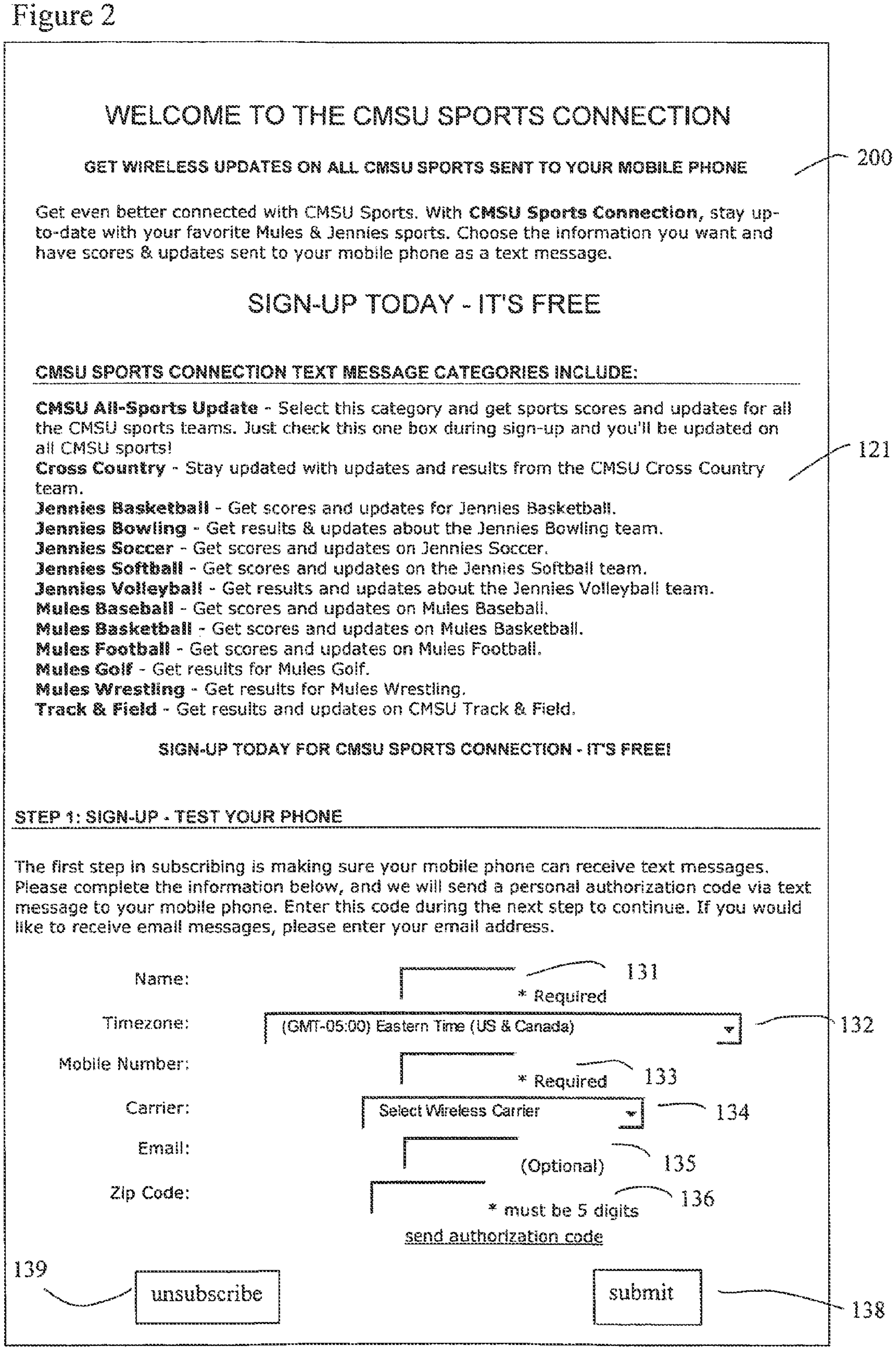

Figure 2

WELCOME TO THE CMSU SPORTS CONNECTION

GET WIRELESS UPDATES ON ALL CMSU SPORTS SENT TO YOUR MOBILE PHONE

Get even better connected with CMSU Sports. With CMSU Sports Connection, stay up-to-date with your favorite Mules & Jennies sports. Choose the information you want and have scores & updates sent to your mobile phone as a text message.

SIGN-UP TODAY - IT'S FREE

CMSU SPORTS CONNECTION TEXT MESSAGE CATEGORIES INCLUDE:

CMSU All-Sports Update - Select this category and get sports scores and updates for all the CMSU sports teams. Just check this one box during sign-up and you'll be updated on all CMSU sports!
Cross Country - Stay updated with updates and results from the CMSU Cross Country team.
Jennies Basketball - Get scores and updates for Jennies Basketball.
Jennies Bowling - Get results & updates about the Jennies Bowling team.
Jennies Soccer - Get scores and updates on Jennies Soccer.
Jennies Softball - Get scores and updates on the Jennies Softball team.
Jennies Volleyball - Get results and updates about the Jennies Volleyball team.
Mules Baseball - Get scores and updates on Mules Baseball.
Mules Basketball - Get scores and updates on Mules Basketball.
Mules Football - Get scores and updates on Mules Football.
Mules Golf - Get results for Mules Golf.
Mules Wrestling - Get results for Mules Wrestling.
Track & Field - Get results and updates on CMSU Track & Field.

SIGN-UP TODAY FOR CMSU SPORTS CONNECTION - IT'S FREE!

STEP 1: SIGN-UP - TEST YOUR PHONE

The first step in subscribing is making sure your mobile phone can receive text messages. Please complete the information below, and we will send a personal authorization code via text message to your mobile phone. Enter this code during the next step to continue. If you would like to receive email messages, please enter your email address.

Name: [          ] * Required
Timezone: [(GMT-05:00) Eastern Time (US & Canada) ▼]
Mobile Number: [          ] * Required
Carrier: [Select Wireless Carrier ▼]
Email: [          ] (Optional)
Zip Code: [          ] * must be 5 digits send authorization code

[unsubscribe]    [submit]

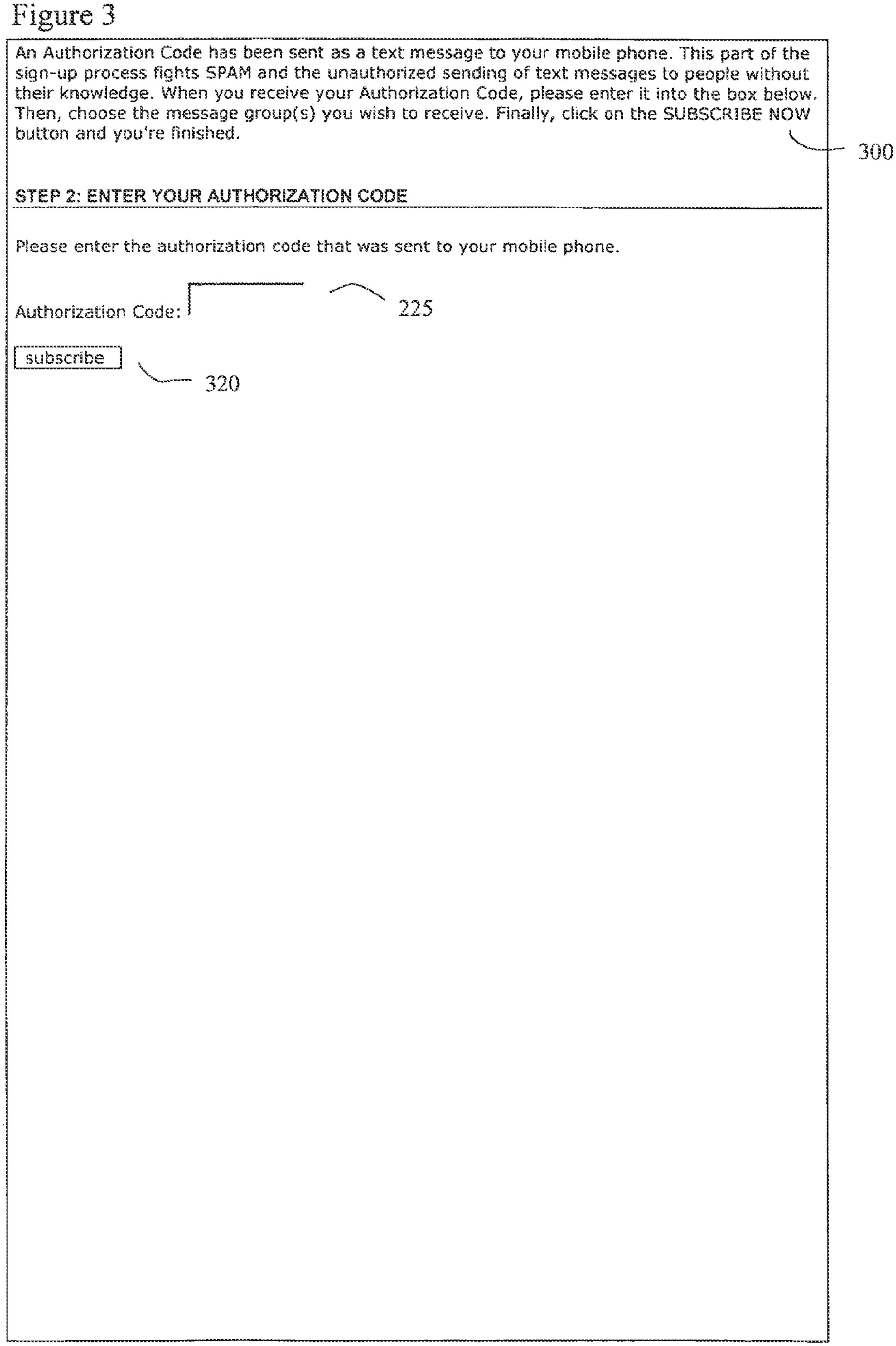

Figure 3

An Authorization Code has been sent as a text message to your mobile phone. This part of the sign-up process fights SPAM and the unauthorized sending of text messages to people without their knowledge. When you receive your Authorization Code, please enter it into the box below. Then, choose the message group(s) you wish to receive. Finally, click on the SUBSCRIBE NOW button and you're finished.

— 300

STEP 2: ENTER YOUR AUTHORIZATION CODE

Please enter the authorization code that was sent to your mobile phone.

Authorization Code: [        ]   225

[subscribe]   — 320

PERMISSION BASED TEXT MESSAGING

RELATED APPLICATIONS

The present application is a continuation of U.S. application Ser. No. 13/776,433, filed Feb. 25, 2013 (now U.S. Pat. No. 8,630,670), which is continuation of U.S. application Ser. No. 13/242,581, filed Sep. 23, 2011 (now U.S. Pat. No. 8,385,955), which is a continuation of U.S. application Ser. No. 11/726,896, filed Mar. 23, 2007 (now U.S. Pat. No. 8,046,012), which is a continuation of U.S. application Ser. No. 11/047,155, filed Jan. 31, 2005 (now U.S. Pat. No. 7,197,324), the disclosures of each of the above-referenced applications are incorporated by reference herein in their entireties.

BACKGROUND OF THE INVENTION

In the communications industry it is often desirable to be able to narrowcast a message that will be received instantly by a large number of people such as potential customers or people who may need to be aware of an emergency situation. Care must be taken not to offend the potential customer or others with unwanted messages such as unsolicited product offerings.

Patent application 2004/0247090 discloses an alert system capable of formatting a message and sending that alert message out over a variety of platforms including text messaging to cell phones. This system uses a database of potential recipients of the message. The problem with the system is that the recipients may not want to receive the message. Even if they are potentially interested in the message, they may be confused as to why they have received the message and may delete the message because they don't know what the message is or why they are receiving it. The public at large has grown wary of unsolicited offers coming by traditional mail, phone, text message and by email. Selling of customer lists and unwanted offers and information can lead to a backlash such as the recent 'no-call' lists in the telemarketing industry. The so called "can-spam" law was put in place to protect consumers against unwanted text messages for example.

Patent application 2004/018683 discloses a system of communicating so called "Amber" alerts to a mobile work force. This system narrowcasts an alert to a closed community of company workers. While those workers may be more receptive to receiving the messages narrowcast, this system still does not suggest a solution to reaching an audience in the general public that is receptive to the information being sent.

As can be seen there is a need for a narrowcast communications system that will allow information to reach the public quickly and efficiently but that information must be wanted by the recipients such that there is no resentment towards the sender.

SUMMARY OF THE INVENTION

The present invention relates to a narrowcast communications system that allows a message to be narrowcast to a receptive audience in the general public that is prepared to receive that message. However, this application is targeted at a method and system that can be called "Narrowcasting". Unlike broadcasting, narrowcasting sends a message to a target audience of potential receivers that have given permission to have the message sent to their cell phone. The present invention further provides for a narrowcast communication system wherein a person can opt in to receive text messages narrowcast from a central location. The person can opt in, for example, by going to a participating web page and clicking on an icon to bring up an application to sign up for text messages. The application may include a variety of potential topics that the potential user may select. The user then can input into the application a cellular phone number and an email address and also select the message category they wish to receive.

The present invention further includes a method for narrowcasting text messages to plurality of cellular phones including the steps of receiving, over a computer network, a request to receive text messages. After the sign up request is received, an authorization code is sent to a cellular phone number received in said request and verifying the authorization code has been received. Then adding the authorized cellular phone number to a list of authorized phone numbers, and placing a text message call to at least a portion of the list of authorized phone numbers.

These and other advantages of the present invention will become apparent from the detailed description of the invention.

BRIEF DESCRIPTION OF THE DRAWINGS

FIG. 2 shows a screen shot of a portion of the system of the present invention;

FIG. 3 shows a screen shot of a portion of the system of the present invention;

DETAILED DESCRIPTION OF THE DEVICE

Sending text messages to cellular phones has become a common way to communicate. It is possible to narrowcast a single message to a plurality of cellular phone users. This application is targeted at a method and system that can be called "Narrowcasting". Unlike broadcasting, narrowcasting sends a message to a target audience of potential receivers that have given permission to have the message sent to their cell phone and/or email. For the purposes of this application 'narrowcasting' means sending a text message and/or email to receivers who have given permission.

Figure 1:
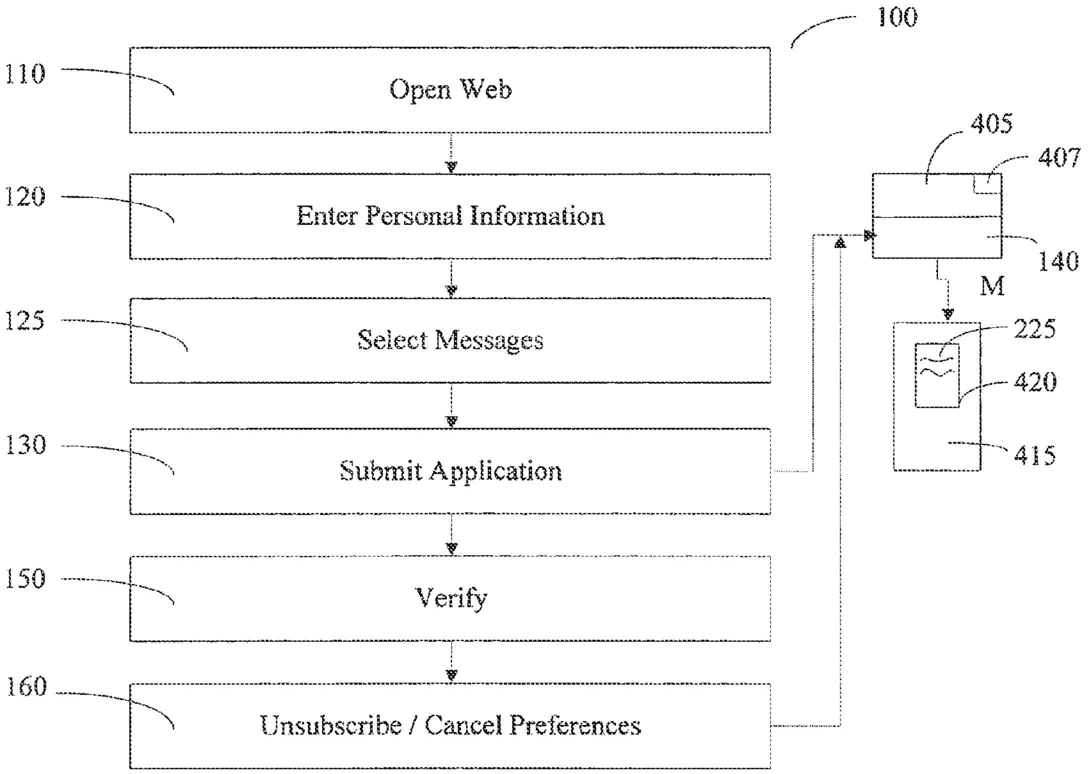
FIG. 1 shows a flow diagram of a portion of the present invention.

FIGS. 1 and 2 show a flow chart of the permission process 100 of how a customer who would typically be remote from a central computer 405, can take the option and give permission to receive text messages from the central computer 405. The potential system user can open 110 the web page, see FIG. 2 for a computer screen shot of the web page based application 200. The potential user can then enter 120 personal contact information and select 125 message topics from a field of possible message topics (121 in FIG. 2). FIG. 2 shows a screen shot of application 200 of the application process as applied to a University sports organization where a potential user can select from a field of possible message topics 121 of sports events as an example. Once the potential user has entered 120 the message topics 121 they want and submitted 130 the application 200, the application 200 can be submitted over a network N to a central computer 405 that includes a database 407 to store information such as a list of authorized cell phone numbers. The central computer 405 will, after a moment delay, send 140 the potential user a message M containing an authorization code 225 to their cell phone 415 for display on cell phone screen 420. Sending 140 the authorization code 225 contained in text message M serves two purposes, it demonstrates the technology to the potential user so that they can see immediately that the system is working to ensure the user's phone is text enabled. It also provides a loop for the user to verify 150 their desire to opt in to the system by entering the authorization code 225 they receive in the text message M back into the opt-in web page, see screen shot FIG. 3. This can prevent unauthorized permission, for example where an unauthorized person might attempt to enroll a person who has not given permission. The unauthorized person would not only need to know the cell phone number but would also need to be in possession of the phone 415 to return the authorization code 225. FIG. 1 also shows that the permission process 100 can include an option for the person to unsubscribe 160 or change message preference. Thus a user can return to the permission process 100 at a later time and unsubscribe 160 from receiving the narrowcast messages M or change message topics 121. FIG. 2 shows that a user can unsubscribe by clicking button 139.

Figure 4:
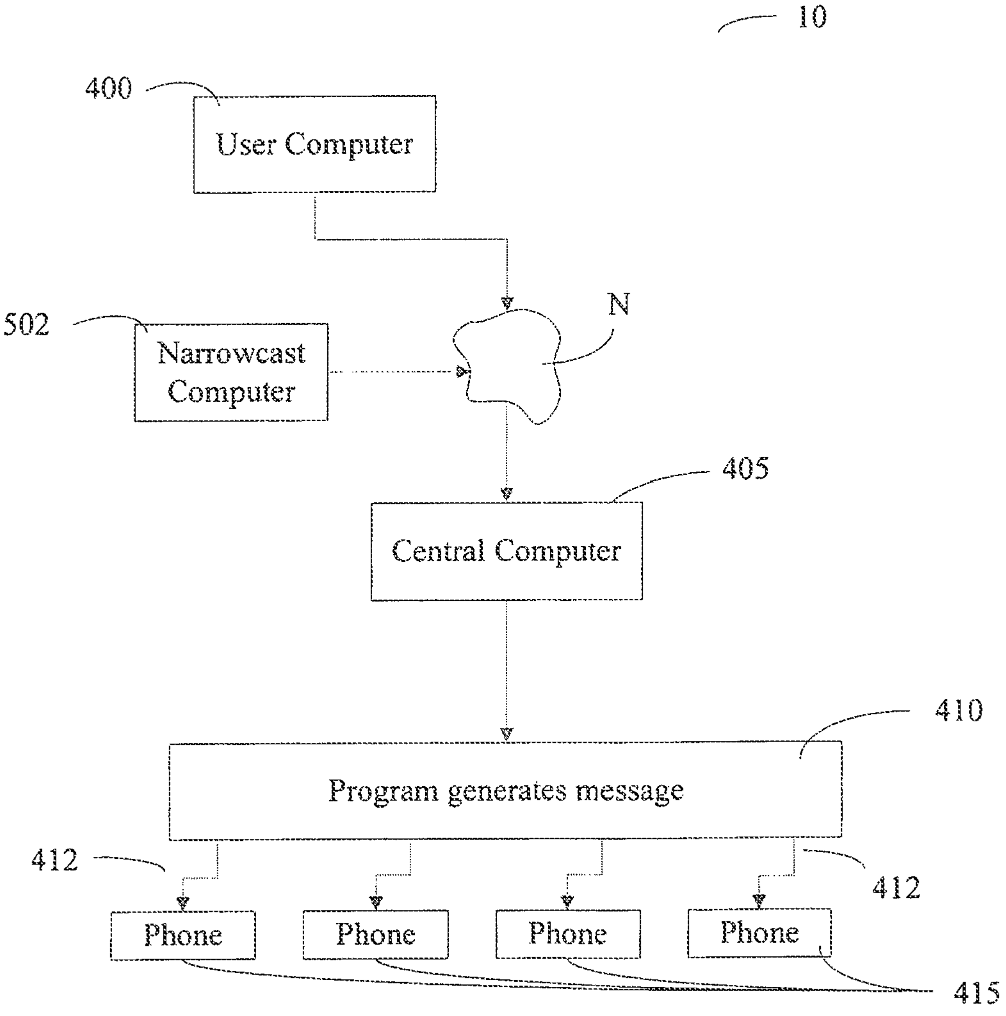
FIG. 4 shows a second flow diagram of a portion of the present invention.

FIG. 2 shows a screen shot of application 200 of the user intake web page as it might be displayed on a user computer 400 (see FIG. 4). The application 200 covers the steps 110, 120, 125 and 130 in FIG. 1. The user can select 125 from a field of topic choices 121. In this case the choices 121 are college athletic teams but could be any topic choice. The application 200 then prompts for personal information such as name 131, timezone 132, mobile or cellular number 133, Carrier 134, email 135 and zip code 136. Once this information 121 and 131-136 is entered the user actually submits the information 121 and 131-136 using a submit button 138. Once submitted via network N such as the Internet, the information 121 and 131-136 will arrive at a central computer (405 FIG. 4). The central computer 405 can then send message M containing an authorization code 225 to the cell phone 415 of the potential user. Once submitted the user computer 400 screen will change from application 200 to authorization 300 to that shown in FIG. 3. Later a person returning to the application 200 can unsubscribe 139 to stop receiving messages from some or all of the topics 121 initially chosen. A user can also return to application 200 later and add additional topics 121 or delete unwanted ones.

FIG. 3 shows a screen shot of the authorization web page 300. The user will be prompted to enter the authorization code 225 that they receive on their cell phone 415 from the central computer 405. The user can then complete the authorization process by clicking the subscribe 320 button. The authorization is then sent from the user's computer (400 FIG. 4) to the central computer 405 via the Internet.

FIG. 4 shows a view of the system 10 which can include a user computer 400 that allows the user to opt into the system 10 through a network N such as the Internet. A central computer 405 which contains the opt in application forms shown in FIGS. 2 and 3. The central computer 405 can include a program 410 to generate and narrowcast text messages 412 to user phones 415 of people who have opted in to receive messages 412. The system can also include a narrowcaster computer 502 where a third party narrowcaster can generate messages to be sent to authorized users and the messages can be forwarded to the central computer 405 to be transmitted. For example, a university may be a third party that wishes to narrowcast messages such as university team scores for sporting events to willing alumni. In this example, the university narrowcaster computer 502 would create a message that would be forwarded through the internet N to the central computer 405 to be transmitted to the cellular phones 415 of alumni who have expressed a willingness to receive the score messages.

Figure 5:
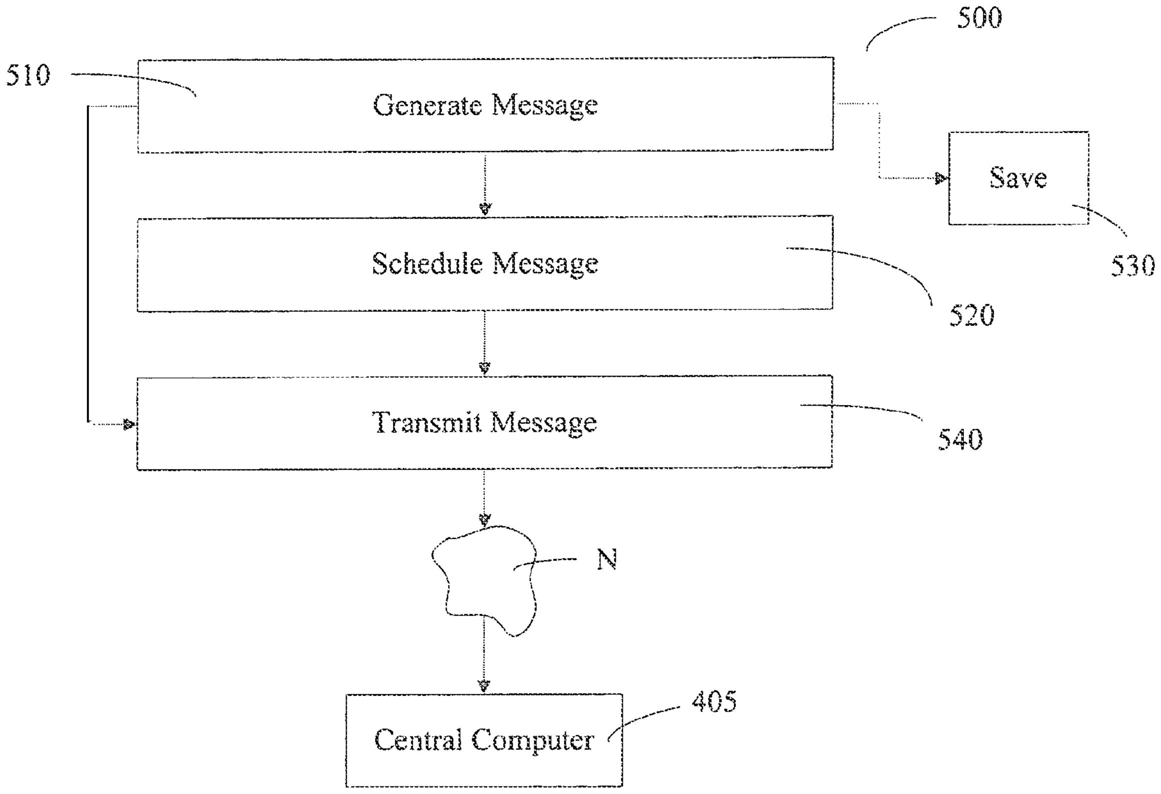
FIG. 5 shows a third flow diagram of a portion of the present invention.

FIG. 5 shows the narrowcast text messages process 500, a narrowcaster might use to narrowcast text messages 412 to a number of users who have given permission to receive the text message 412. The narrowcaster first generates 510 a message 412 to be narrowcast. The generation step 510 can include inputting characters into a text message box 602 (see FIG. 6). The message 412 can be sent immediately or scheduled 520 for narrowcast at a specific time and date. The message can be scheduled 520 for recurring transmission such as daily or monthly. The narrowcaster can save 530 the message 412 for future use and transmit 540 the message. Many narrowcasters will not actually have a computer system to transmit multiple text messages or email. Rather the transmit 540 step will involve sending the message 412 over a computer network N to the central computer 405 where the phone numbers of the phones 415 authorized to receive the message 412 can be stored.

Figure 6:
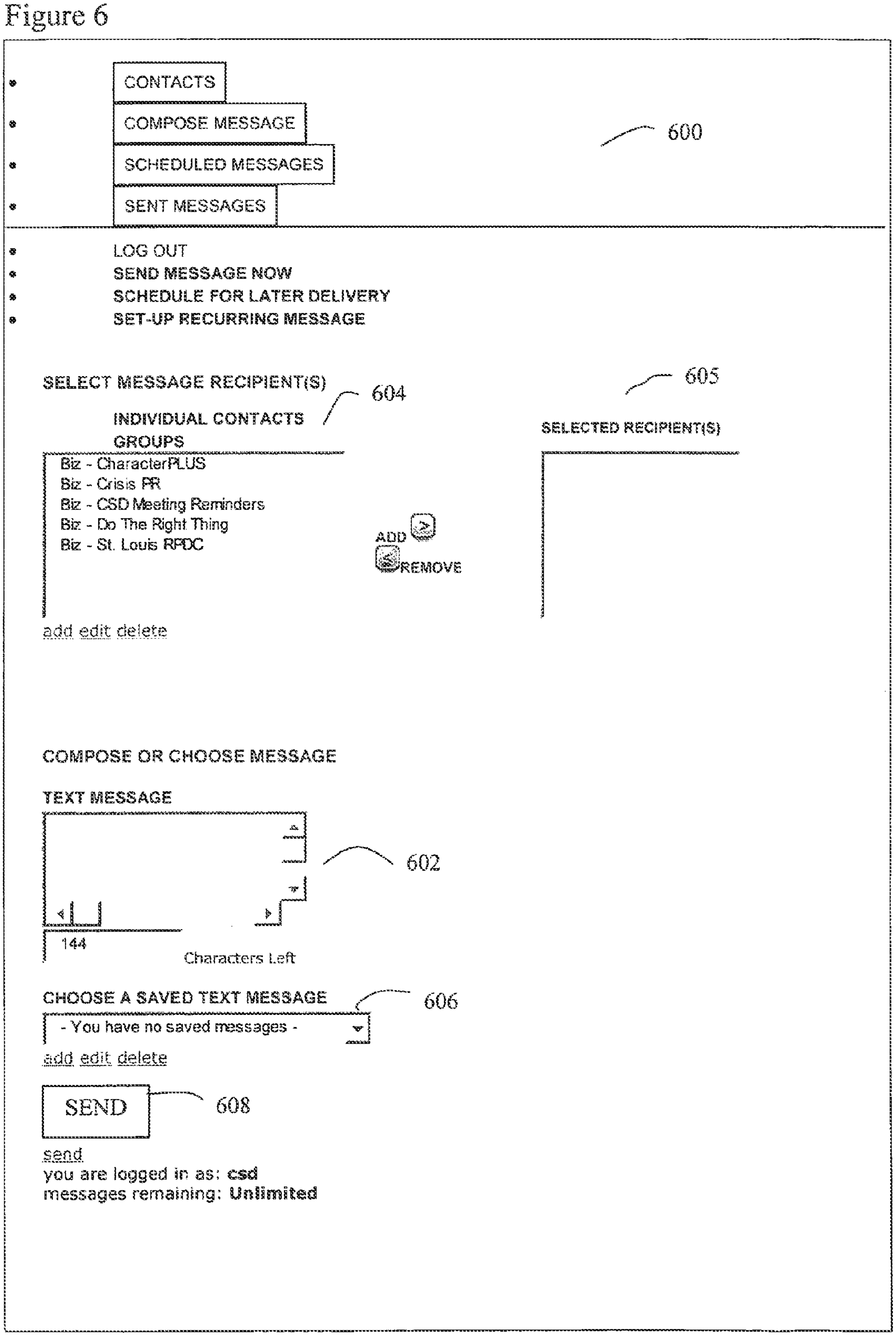
FIG. 6 shows a screen shot of the process for message creation and narrowcasting.

FIG. 6 shows a screen shot 600 containing some of the details of the narrowcast text messages process 500. The screen 600 can include a text box 602 to compose a message 412 to be sent. The narrowcaster can select message recipients 605 that can include authorized individuals or groups of individuals who might receive a message 412. The narrowcaster can also select the option of saving 606 a message 412 and can choose to send 608 a message 412 from screen 600. When the narrowcaster selects send 608, the narrowcaster's computer will contact the central computer 405 through the network N and the central computer 405 will send the generated text message 412 to the recipients 605 selected from a list of all authorized recipients 604. The text message 412 will be sent essentially simultaneously to all cellular phones 415 on the list 605 of recipients.

In use, a potential user learns of the possibility of receiving one or more text messages 412 on a topic they are interested in such as scores of a sports team at their school. The potential user can be directed to a web page where the user can complete an on-line application 200 and submit the on-line application 200 via the network N such as the Internet. A central computer 405 receives the on line application 200 and can send an authorization code 225 in a text message M to the cell phone number indicted in the online application 200. The potential user must then authorize the online application 200 by sending the authorization code 225 back over the Internet N to the central computer 405. Authorization can occur through a separate authorization web page 300. Although the preferred process shows a web site, it would be possible for the potential user to send a request via email, to receive the authentication code back on their cell phone and then to send a second email to verify the authorization code 225. Either method verifies that the person asking for permission actually possesses the cell phone being authorized to receive messages 412.

While the invention has been described in reference to a preferred embodiment, it is not necessarily limited to the particulars set forth. On the contrary, it is intended to cover such alternatives, modifications and equivalents as set forth in the spirit and scope of the invention as defined by the appended claims.

The invention claimed is:

1. A computer system, comprising:

a central processor; and a memory configured to store data in a data structure, wherein the data includes information indicating permission to cause respective future text messages to be transmitted to each of two or more communication devices;

wherein the computer system is configured to receive subscription preference information for a plurality of particular future text messages to be transmitted to one or more phone numbers that correspond to one or more other communication devices, wherein the other communication devices are not any of the two or more communication devices; and wherein the computer system is further configured to, in response to receiving input that includes an authorization code, update the data stored in the data structure based on the subscription preference information received, such that the data includes information indicating permission to cause the plurality of particular future text messages to be transmitted to at least one of the other communication devices.

2. The computer system of claim 1, further comprising:

a web server configured to provide one or more web pages facilitating the receiving of the subscription preference information.

3. The computer system of claim 1, wherein the computer system is configured to, in response to receiving the subscription preference information, cause a text message to be sent to the at least one of the other communication devices, wherein the text message includes the authorization code, and wherein the text message is addressed to a phone number corresponding to the at least one of the other communication devices.

4. The computer system of claim 1, wherein the computer system is further configured to, in response to the computer system receiving input that includes a second authorization code, update the data stored in the data structure based on the subscription preference information received, such that the data includes information indicating permission to cause the plurality of particular future text messages to be transmitted to two of the other communication devices.

5. The computer system of claim 1, wherein the computer system is further configured to receive a selection of at least one of a plurality of subject categories, wherein the plurality of particular future text messages include content that is at least partially based on the selection.

6. The computer system of claim 1, further comprising:

a second computer system that is connected to the computer system via a network connection.

7. A method, comprising:

a computer system storing data in a data structure, wherein the data includes permission information indicating permission to cause respective future text messages to be transmitted to each of two or more communication devices;

the computer system receiving subscription preference information for a plurality of particular future text messages to be transmitted to one or more phone numbers that correspond to one or more other communication devices, wherein the other communication devices are not any of the two or more communication devices; and in response to the computer system receiving input that includes an authorization code, the computer system updating the data stored in the data structure based on the subscription preference information received, such that the data includes permission information indicating permission to cause the plurality of particular future text messages to be transmitted to at least one of the other communication devices.

8. The method of claim 7, further comprising:

in response to receiving the subscription preference information, the computer system causing a text message to be sent to the at least one of the other communication devices, wherein the text message includes the authorization code, and wherein the text message is addressed to a phone number corresponding to the at least one of the other communication devices.

9. The method of claim 7, further comprising:

subsequent to the updating the data stored in the data structure, the computer system receiving specific content for a first one of the plurality of particular future text messages; and the computer system causing the first text message to be transmitted to at least one of the other communication devices, wherein the first text message includes the specific content.

10. The method of claim 7, wherein the subscription preference information indicates a user's selection of one or more subject categories for the plurality of particular future text messages.

11. The method of claim 10, wherein at least one of the one or more subject categories relates to sports.

12. The method of claim 7, further comprising:

the computer system receiving additional subscription preference information, and storing a corresponding list of phone numbers that are authorized to receive individual ones of the plurality of particular future text messages.

13. The method of claim 7, wherein at least a first one of the plurality of particular future text messages is specific to a geographic area associated with a user.

14. The method of claim 13, wherein the specific geographic area is indicated by a zip code associated with the user.

15. The method of claim 7, further comprising:

the computer system unsubscribing the at least one of the other communication devices from receiving additional future text messages.

16. A non-transitory computer-readable storage medium having instructions stored thereon that are executable by a computer system to cause the computer system to perform operations comprising:

storing data in a data structure, wherein the data includes permission information indicating permission to cause respective future text messages to be transmitted to each of two or more communication devices;

receiving subscription preference information for a plurality of particular future text messages to be transmitted to one or more phone numbers that correspond to one or more other communication devices, wherein the other communication devices are not any of the two or more communication devices; and in response to receiving input that includes an authorization code, updating the data stored in the data structure based on the subscription preference information received, such that the data includes permission information indicating permission to cause the plurality of particular future text messages to be transmitted to at least one of the other communication devices.

17. The non-transitory computer-readable storage medium of claim 16, wherein the operations further comprise:

in response to receiving the subscription preference information, generating the authorization code for inclusion in a text message to be sent to the at least one of the other communication devices.

18. The non-transitory computer-readable storage medium of claim 16, wherein the operations further comprise:

modifying the permission information to indicate that a user of the at least one of the other communication devices has consented to receive one or more different future text messages corresponding to a different subject category than a subject category relating to the plurality of particular future text messages; and updating the data stored in the data structure based on the modifying.

19. The non-transitory computer-readable storage medium of claim 16, wherein the operations further comprise:

scheduling at a selected time, a future transmission of at least one of the plurality of particular future text messages to be transmitted to the at least one of the other communication devices.

20. The non-transitory computer-readable storage medium of claim 16, wherein the operations further comprise:

unsubscribing the at least one of the other communication devices from receiving additional further text messages.

* * * * *